United States Patent
Harris (10) Patent No.: US 12,263,427 B1
(45) Date of Patent: Apr. 1, 2025

(54) METHOD OF FORMING A CUSTOM AIR FILTER

(71) Applicant: Air-Rite, Inc., Lakewood, OH (US)

(72) Inventor: David Harris, Rocky River, OH (US)

(73) Assignee: Air-Rite, Inc., Lakewood, OH (US)

( * ) Notice: Subject to any disclaimer, the term of this patent is extended or adjusted under 35 U.S.C. 154(b) by 1057 days.

(21) Appl. No.: 17/147,385

(22) Filed: Jan. 12, 2021

Related U.S. Application Data (60) Provisional application No. 62/963,405, filed on Jan. 20, 2020.

(51) Int. Cl.
| | |
|---|---|
| *B01D 46/00* | (2022.01) |
| *B01D 46/10* | (2006.01) |
| *B01D 46/52* | (2006.01) |
| *B23D 51/00* | (2006.01) |
| *B32B 38/00* | (2006.01) |
| *F24F 13/28* | (2006.01) |

(52) U.S. Cl.
CPC ..... *B01D 46/0001* (2013.01); *B01D 46/0005* (2013.01); *B01D 46/10* (2013.01); *B01D 46/521* (2013.01); *B23D 51/00* (2013.01); *B01D 2265/04* (2013.01); *B01D 2265/06* (2013.01); *B32B 38/0004* (2013.01); *F24F 13/28* (2013.01)

(58) Field of Classification Search
CPC ............... B01D 46/00; B01D 46/0001; B01D 46/0005; B01D 46/10; B01D 46/50; B01D 46/52; B01D 46/521; B23D 51/00; F24F 13/28; B31D 5/0082; B31B 5/0082; B32B 38/0004

See application file for complete search history.

(56) References Cited

U.S. PATENT DOCUMENTS

| | | | | |
|---|---|---|---|---|
| 4,031,793 A | * | 6/1977 | Miaskoff | B26D 1/0006 83/788 |
| 4,056,376 A | | 11/1977 | Schuldenfrei | |
| 4,340,402 A | * | 7/1982 | Catron | B01D 46/10 55/501 |
| 4,600,420 A | * | 7/1986 | Wydeven | B01D 46/10 55/501 |
| 5,772,713 A | | 6/1998 | Salinas | |
| 6,007,596 A | | 12/1999 | Rosen | |

(Continued)

OTHER PUBLICATIONS

Youtube Video, "Resize a Furnace Filter" (https://www.youtube.com/watch?v=YmjpOD6vsvs) (Year: 2019).*

*Primary Examiner* — Scott W Dodds
(74) *Attorney, Agent, or Firm* — Calfee, Halter & Griswold LLP (57) ABSTRACT

A method of forming a custom air filter is disclosed. In accordance with the method, a first air filter having a first size is provided. A length of support material is also provided and includes a substrate covered with a pressure sensitive adhesive, over which a release layer is disposed. At least a first portion of the first air filter is cut and removed to form a nascent air filter. The length of support material is manipulated to have a channel configuration, and the release layer is removed to expose the pressure sensitive adhesive of the length of support material. The length of support material with the channel configuration is pressed into engagement with the nascent air filter such that the exposed pressure sensitive adhesive bonds to the nascent air filter, thereby forming the custom air filter.

20 Claims, 8 Drawing Sheets

(56) References Cited

U.S. PATENT DOCUMENTS

| | | | |
|---|---|---|---|
| 6,273,938 B1 * | 8/2001 | Fanselow | B01D 46/0036 55/497 |
| 6,793,715 B1 | 9/2004 | Sandberg | |
| 6,926,781 B2 * | 8/2005 | Duffy | B01D 29/012 55/497 |
| 7,537,632 B2 | 5/2009 | Miller | |
| 7,947,101 B2 | 5/2011 | Devine | |
| 7,976,606 B1 | 7/2011 | Nicholson | |
| 8,388,717 B2 | 3/2013 | Livingstone | |
| 8,784,528 B2 | 7/2014 | Gorman | |
| 8,986,414 B2 | 3/2015 | Sullivan | |
| 10,195,557 B2 | 2/2019 | Gorman | |
| 10,247,442 B2 * | 4/2019 | Brooks | B01D 46/0005 |
| 10,335,729 B1 | 7/2019 | Nance | |
| 2002/0064629 A1 * | 5/2002 | Yoshii | B32B 3/28 428/184 |
| 2005/0150201 A1 | 7/2005 | Choi | |
| 2006/0053759 A1 | 3/2006 | Winters | |
| 2012/0167535 A1 * | 7/2012 | Underwood | B01D 46/0001 55/497 |

\* cited by examiner

METHOD OF FORMING A CUSTOM AIR FILTER

CROSS-REFERENCE TO RELATED APPLICATION

This patent application claims the benefit of priority under 35 U.S.C. § 119 (e) to Provisional Patent Application No. 62/963,405 filed on Jan. 20, 2020, which is incorporated herein by reference.

TECHNICAL FIELD

This disclosure relates generally to air filters and more particularly to custom air filters and methods of forming them.

BACKGROUND

Disposable air filters are manufactured in large scale in only a limited number of standard sizes based on standard HVAC systems and methods of installation. However, many older buildings and some newer buildings have unique HVAC installations that require disposable air filters with non-standard sizes. Custom air filters with non-standard sizes can be prohibitively expensive to produce from initial components, i.e., from scratch. To reduce costs, custom air filters are often produced by modifying standard size air filters. Conventional methods for modifying standard size air filters, however, are time-consuming and often result in poorly constructed end products. As such, an improved method for producing custom air filters would be desirable.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

It should be noted that in the detailed description that follows, identical components have the same reference numerals, regardless of whether they are shown in different embodiments of the present disclosure. It should also be noted that for purposes of clarity and conciseness, the drawings may not necessarily be to scale and certain features of the disclosure may be shown in somewhat schematic form.

Spatially relative terms, such as "top", "bottom", "lower", "above", "upper", and the like, are used herein merely for ease of description to describe one element or feature's relationship to another element(s) or feature(s) as they are illustrated in (a) drawing figure(s) being referred to. It will be understood that the spatially relative terms are not meant to be limiting and are intended to encompass different orientations of the device in use or operation in addition to the orientation depicted in the drawings.

The present disclosure is directed toward a disposable custom air filter 100 having a custom size and a method of forming the same from a standard size air filter 10.

Figure 1:
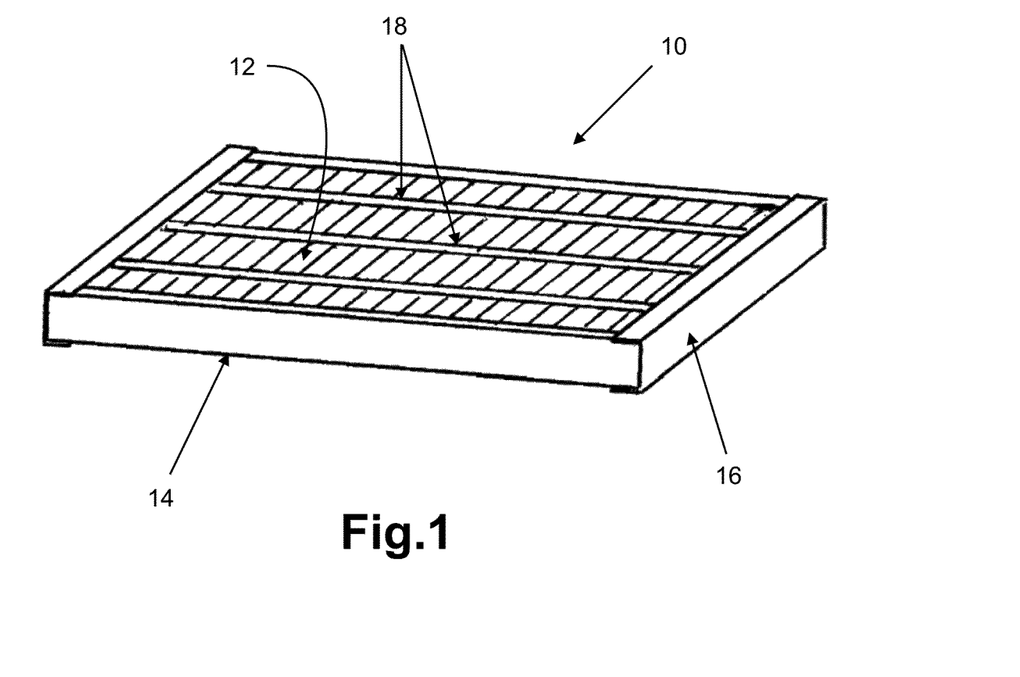
FIG. 1 shows a perspective view of a standard air filter.
Figure 2:
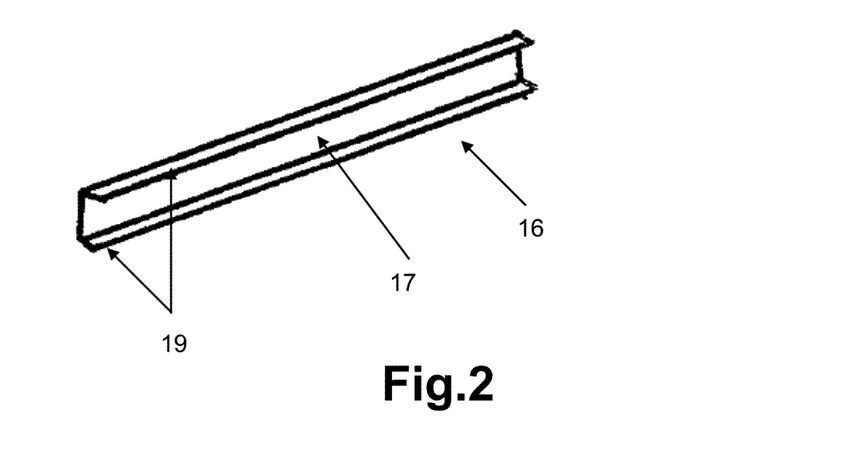
FIG. 2 shows a perspective view of a frame member of the standard air filter.
Figure 10:
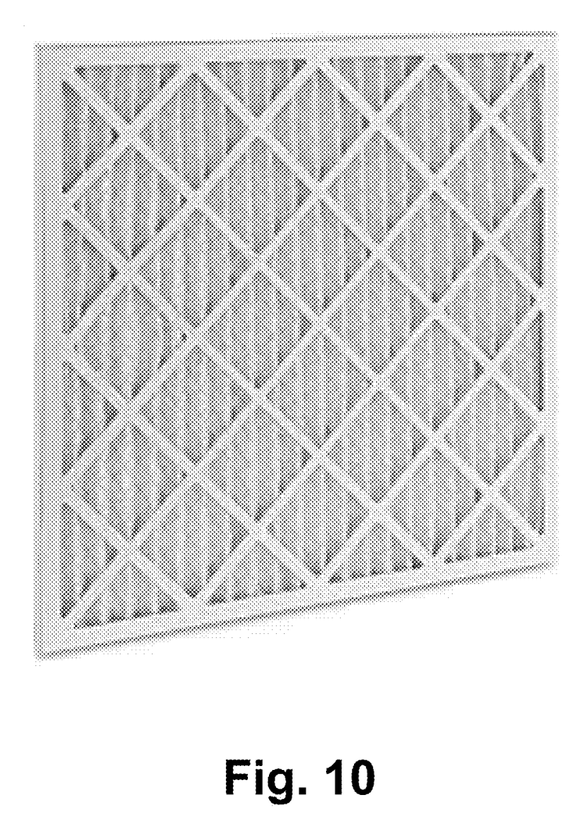
FIG. 10 shows a perspective view of another type of standard air filter.

Referring now to FIGS. 1 and 2, the standard size air filter 10 includes filter material 12 held within an outer frame 14. The filter material 12 may be pleated fibrous material having a rectangular shape, while the outer frame 14 may be comprised of one or more channel-shaped frame members 16 secured or joined together to form a rectangle. The frame members 16 may be composed of cardboard or other thin material. Support cross members 18 may be joined to and extend between opposing frame members 16. Each frame member 16 includes a base 17 joined between a pair of flanges 19. The outer frame 14 may include end frame members 16a and side frame members 16b. The end frame members 16a and the side frame members 16b may all be separate pieces, or may be joined together in a single piece of material that is partitioned by 90° bends. Alternately, the frame members 16, as well as the cross members 18 may be formed from two identical die cut sheets of material (e.g., cardboard or thick paper) that are secured together, with the filter material 12 sandwiched in between, as shown in FIG. 10.

Figure 3:
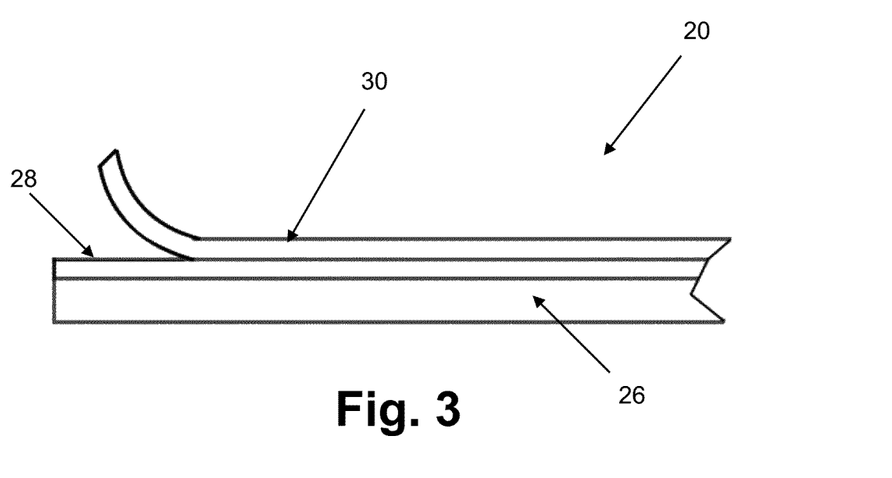
FIG. 3 shows a schematic representation of a portion of a support material used to form a replacement frame member, wherein a top release liner is starting to be peeled away to expose a layer of PSA underneath.
Figure 4:
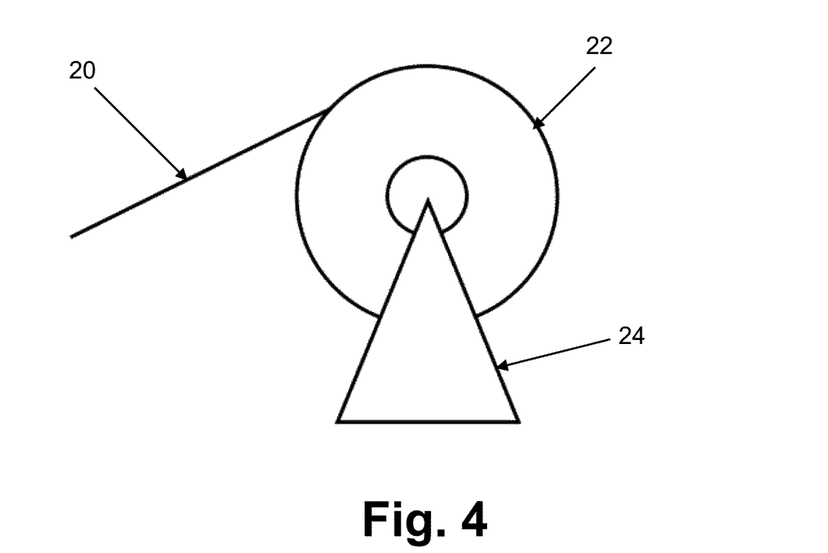
FIG. 4 shows a length of the support material being dispensed from a roll of the support material.
Figure 5:
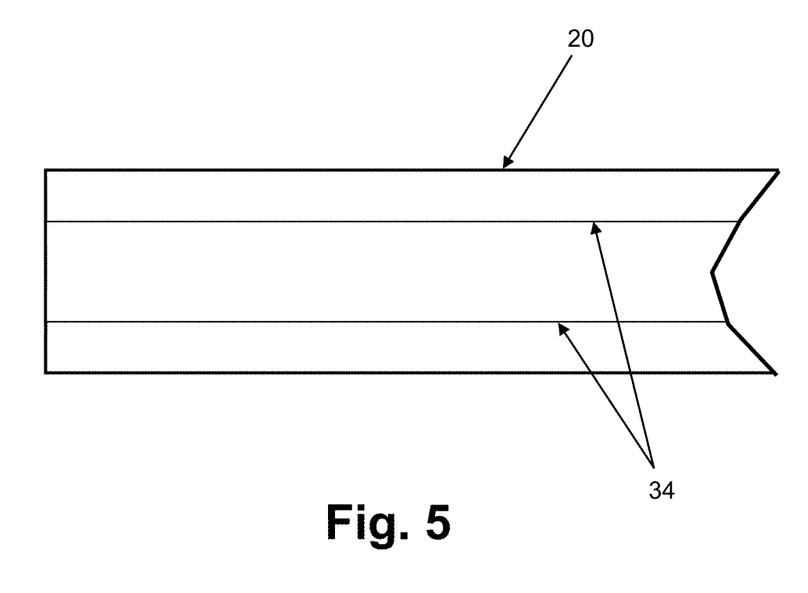
FIG. 5 shows a plan view of a length of the support material.

Referring now to FIGS. 3-5, an amount of support material 20 is provided for forming structural members that are used to modify the standard size air filter 10 to form the air filter 100. The support material 20 may be pre-cut to have a standard width, which is equal to the total flattened width of the base 17 and the flanges 19 of a frame member 16 of the standard size air filter 10. The support material 20 may be provided in a roll 22, which may be mounted to a spindle supported on reel stands 24 and from which the support material 20 may be dispensed and cut to appropriate lengths.

The support material 20 comprises a substrate 26, which may be comprised of cardboard or other type of semi-rigid material that is capable of being folded and/or bent, such as a thin, flexible plastic. The substrate 26 is covered with a layer 28 of a pressure-sensitive adhesive (PSA). A removable protective layer or release liner 30 is adhered to the layer 28 of PSA. The support material 20 may have a pair of parallel, spaced-apart scores 34 formed therein that extend in the longitudinal direction of the support material 20. The scores 34 facilitate the formation of two folds that provide the support material 20 with a channel shape, as discussed more fully below. The layer 28 and the release liner 30 may be components of a double-sided adhesive tape having one side bonded to the substrate 26 and the other side comprising PSA with a release liner disposed thereon. Alternately, the layer 28 of PSA may be coated directly on the substrate 26. The substrate 26 may have a thickness of from about 0.015 inches to about 0.04 inches, more preferably about 0.024 inches. The layer 28 of PSA may have a thickness of about 1 mil to about 1.5 mil. In the embodiment where the layer 28 and the release liner 30 are components of a double-sided adhesive tape, the double-sided adhesive tape may comprise a carrier with adhesive on one side that bonds to the substrate 26 and PSA on the other side that is covered with a release liner. The carrier may be comprised of thin (about 0.5 mil) plastic, such a polyethylene terephthalate (PET).

The PSA is a viscoelastic composition, which, in dry form at room temperature, remains permanently tacky and adhesive. Bonding is accomplished using moderately applied pressure, such as hand pressure. The PSA may have any suitable composition and may generally include an elastomer compounded with a tackifier. The elastomer may include one or more of natural rubber, polyisoprene, styrene-butadiene rubber (SBR), rubbery polyolefins, acrylic polymers and vinyl ether polymers. The tackifier may be a rosin ester or a terpene.

The release liner 30 is in full and consistent contact with the layer 28 of PSA until it is removed by being peeled away from the layer 28. The release liner 30 does not chemically interact with or contaminate the PSA and resists cutting and other processing steps. The release liner 28 may be a thin film of polyethylene terephthalate, propylene, high density polyethylene, or other suitable plastic. A release agent, such as silicone, may coat the thin plastic film of the release liner 30.

Figure 7:
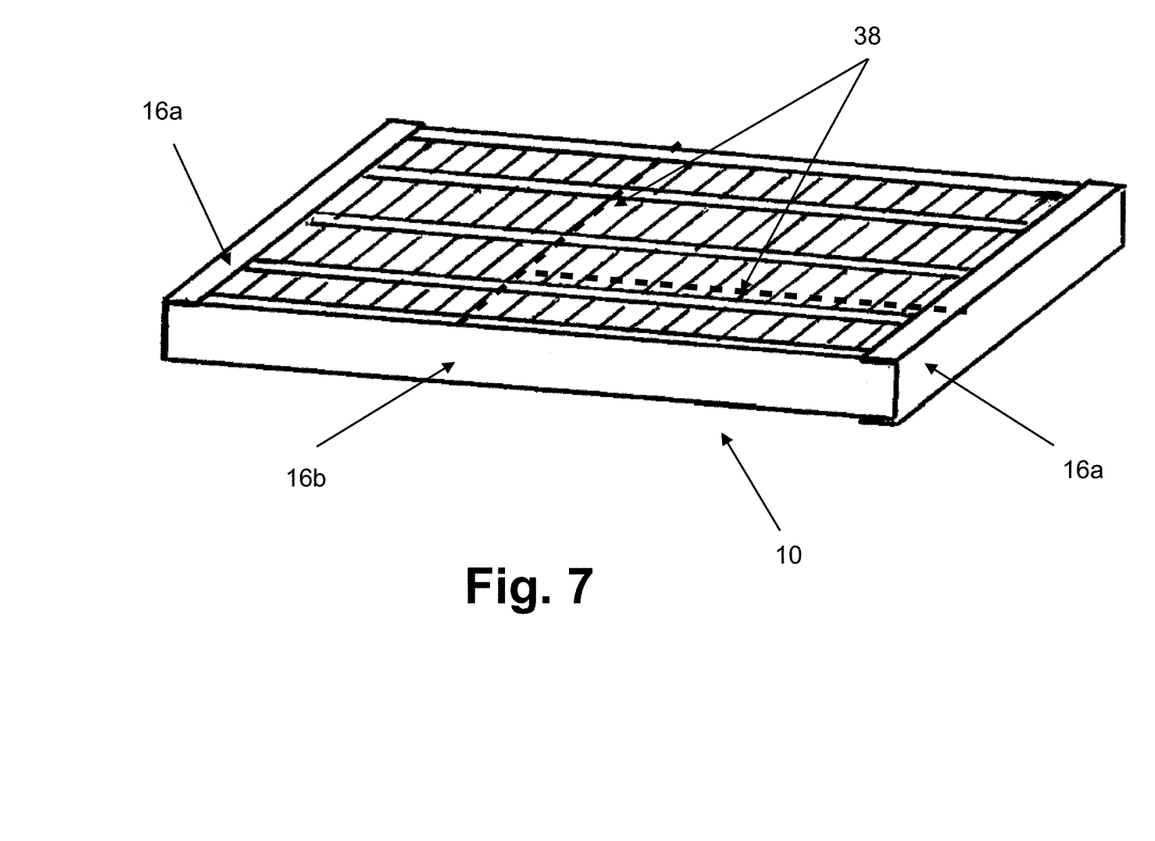
FIG. 7 shows a perspective view of the standard air filter with dashed lines superimposed thereon to indicate the location of where cuts are to be made.

In a first step of a method of forming the air filter 100, an end portion and/or a side portion of the standard size air filter 10 is cut-away to form a nascent filter 36 having about the same dimensions as the desired custom size filter 100. In an embodiment shown in FIGS. 7 and 8, cuts 38 are made in the air filter 10 to remove both a top portion and a side portion of the air filter 10 to form the nascent filter 36. In so doing, a (top) end frame member 16a, a side frame member 16b and end and side portions of the filter material 12 are completely removed.

Figure 6:
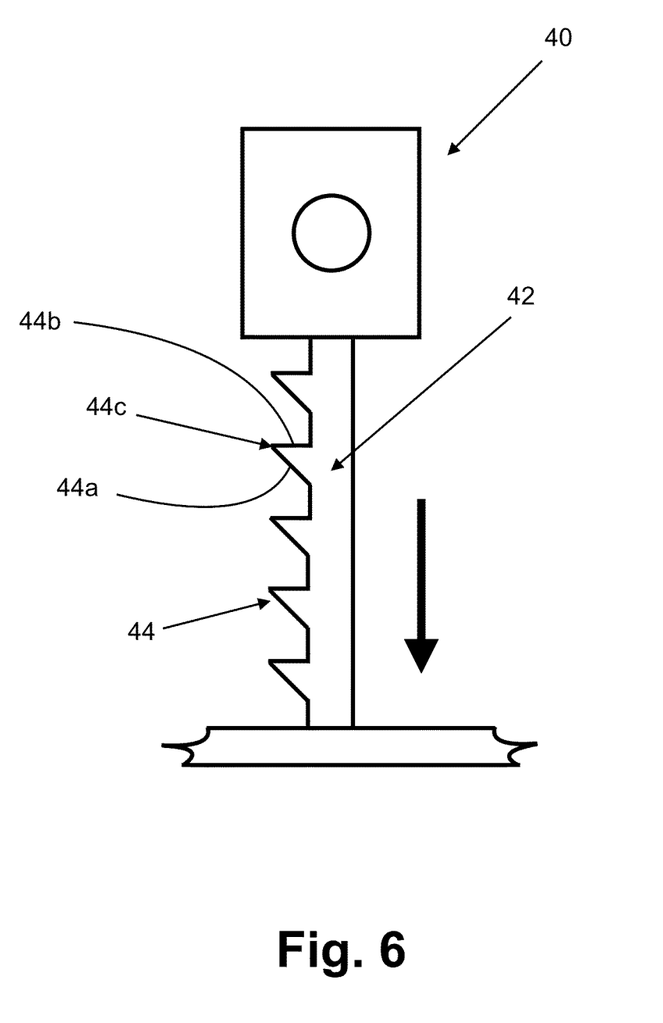
FIG. 6 shows a photograph of a band saw used to cut the standard air filter to form a nascent air filter.

The cutting may be performed using a band saw 40 (shown in FIG. 6) having a continuous blade 42 with teeth 44. Each tooth 44 has an elongated sloping edge 44a that joins a short horizontal edge 44b at a point 44c. The band saw 40 is configured and operated to have the blade run in reverse, i.e., in the direction indicated by the arrow in FIG. 6. In this manner, the sloping edges 44a of the blade 42 contact the material being cut first. This is opposite to how a band saw normally operates, namely the horizontal edges and the points contact the material being cut first. Applicant has found that by running the blade 42 backwards, the blade 42 makes a cut in a frame member 16 that is smooth and does not fray the material of the frame member 16.

Figure 8:
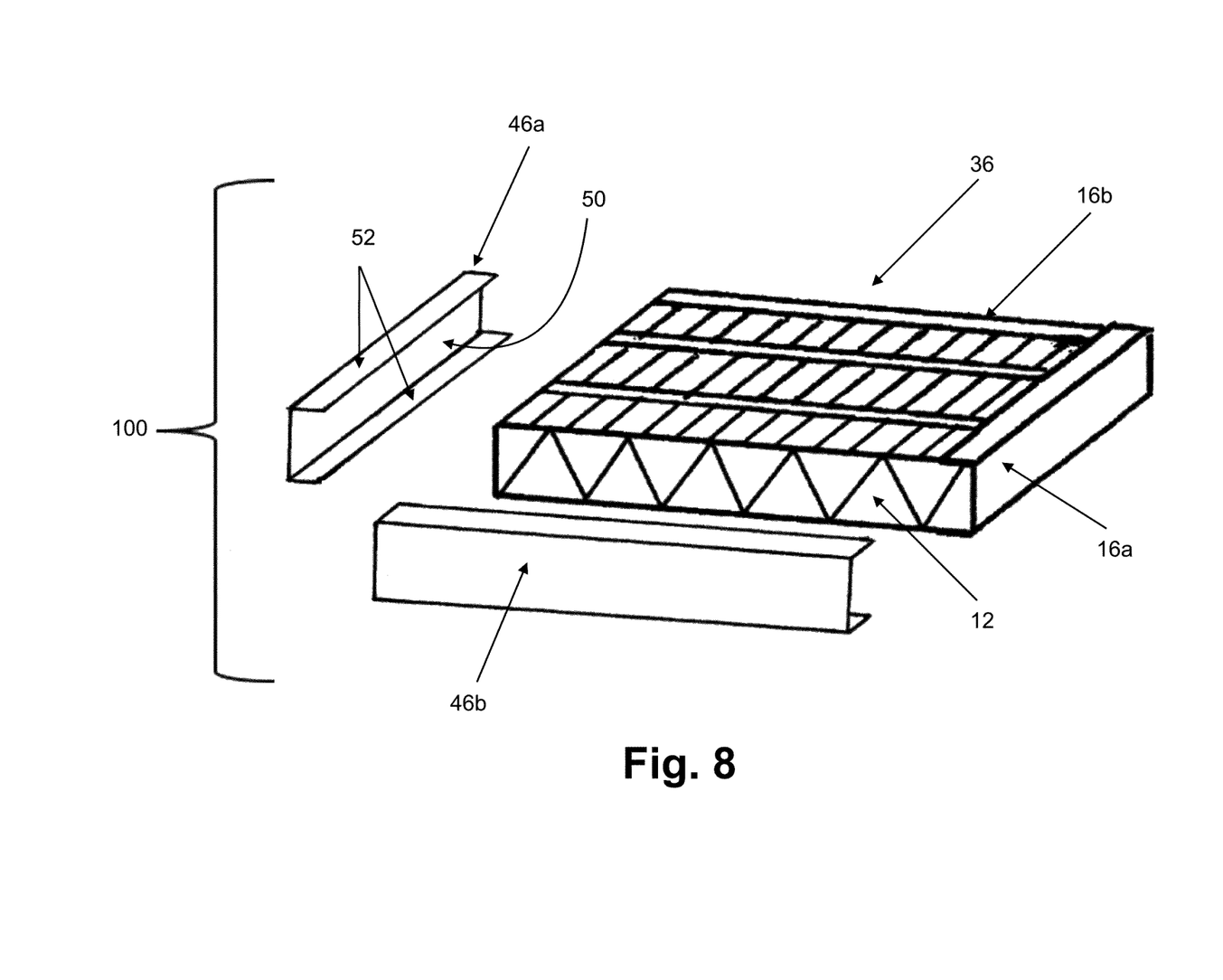
FIG. 8 shows a perspective view of a custom air filter being assembled from the nascent air filter and a pair of the replacement frame members.

Reference is now made to FIG. 8. After the nascent filter 36 has been formed in the cutting step, a portion of the support material 20 is cut from the supplied amount to have a length corresponding to about the width of the nascent filter 36; the cut portion being a replacement (top) end frame member 46a. A second portion of the support material 20 is also cut from the supplied amount to have a length corresponding to the height of the nascent filter 36; the cut second portion being a replacement side frame member 46b. Each of the replacement frame members 46 is formed into a channel by making folds along the scores 34. In this manner, each replacement frame member 46 has a base 50 joined between a pair of flanges 52.

The release liner 30 is removed from the replacement side frame member 46b and then the replacement side frame member 46b is pressed (such as by hand) over the exposed filter material 12 and an end portion of the original (bottom) end frame member 16a so that the PSA adheres to the filter material 12 and the end frame member 16a. More specifically, the PSA on the base 50 adheres to the filter material 12, while the PSA on the flanges 52 adheres to the original end frame member 16a.

The release liner 30 is removed from the replacement (top) end frame member 46a and then the replacement (top) end frame member 46a is pressed over the exposed filter material 12 and end portions of the replacement side frame member 46b, the original side frame member 16b and the cross members 18, so that the PSA adheres to the filter material 12, the side frame members 46b, 16b and the cross members 18. More specifically, the PSA on the base 50 adheres to the filter material 12, while the PSA on the flanges 52 adheres to the side frame members 46b, 16b and the cross members 18.

The adherence of the filter material 12 to the PSA of the replacement frame members 46 forms a seal therebetween that prevents air from bypassing the filter material 12 and escaping unfiltered.

It should be appreciated that in lieu of cutting two pieces of the support material 20 from the supplied amount to form separate replacement frame members 46a, b, a single, elongated piece of the support material 20 may be cut from the supplied amount. This single piece may then be bent into an L-shape to thereby form replacement frame members 46a,b, which are joined together, but are partitioned by a bend. The release liner 30 is then removed and the L-shaped replacement frame members 46a,b are pressed over the exposed filter material 12 and the end portions of the original (bottom) end frame member 16a and the original side frame member 16b.

The securement of the replacement frame members 46a,b to the nascent filter 36, as described above, forms the custom air filter 100, which is smaller in shape than the standard size air filter 10.

Figure 9:
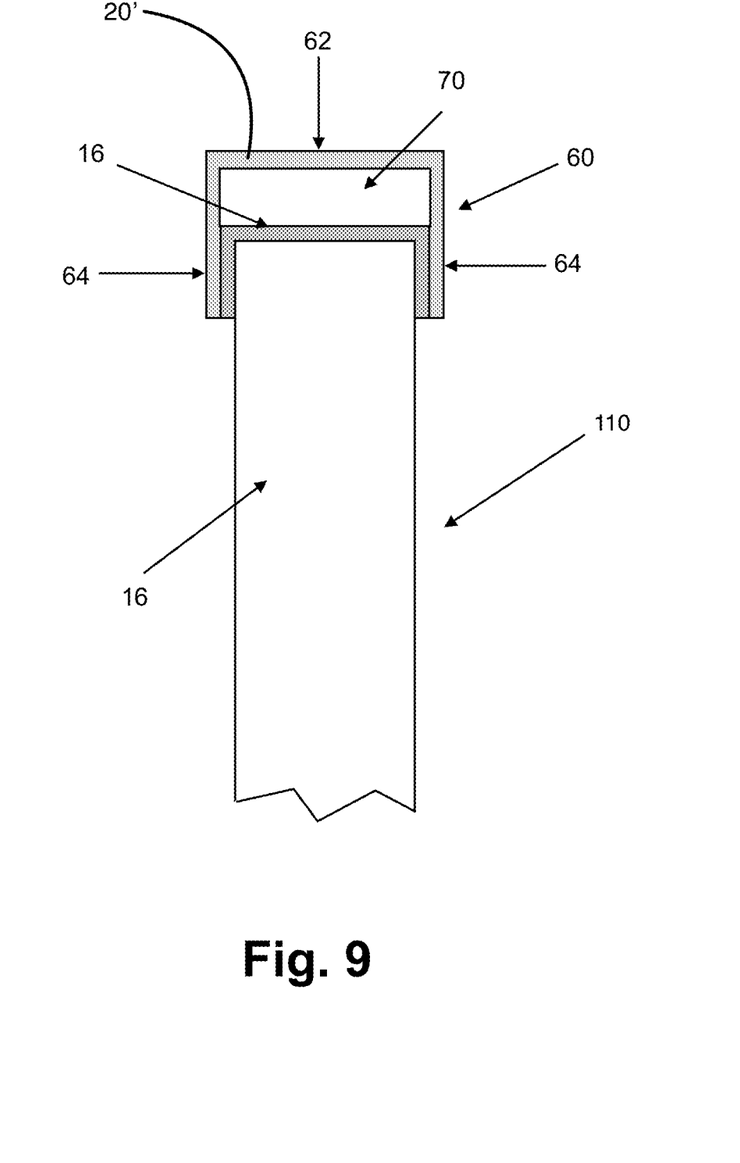
FIG. 9 shows a schematic sectional view of a portion of a custom air filter formed from one or more lengths of the support material.

Instead of forming a custom air filter 100 that is smaller than the standard air filter 10, support material 20' may be used in another method of the disclosure to modify the standard air filter 10 to form a custom air filter 110 that is larger in size than the standard air filter 10. In this method, the support material 20' is wider in size than the support material 20 described above, but otherwise has the same construction. A piece of the wider support material 20' is cut from a supplied amount thereof and is formed into a frame member 60, which is shown in FIG. 9. The frame member 60 includes a base 62 joined between a pair of flanges 64. The flanges 64 are significantly longer than the flanges 19 of the frame members 16.

After the support material 20' is cut and formed into the frame member 60, the release liner 30 is removed so as to expose the PSA layer 28. The frame member 60 is then placed over a frame member 16 of the standard air filter 10, with its flanges 64 bent outward. With the outer edges of the flanges 64 of the frame member 60 aligned with the outer edges of the flanges 19 of the frame member 16, the flanges 64 are then bent inward to press the PSA layers 28 into engagement with the outer surfaces of the flanges 19, thereby securing the frame member 60 to the frame member 16. The securement of the frame member 60 to the frame member 16 forms a space 70 therebetween and modifies the standard air filter 10 to extend its length or width.

Additional frame members 60 may be formed and secured to other frame members 16 of the standard air filter 10 to further increase its size. In this manner, the standard air filter 10 is transformed into the larger custom air filter 110.

In another embodiment of the present disclosure, the two support materials 20, 20' may be used form a custom air filter that is smaller in one dimension than the standard air filter 10, but is larger in another dimension than the standard air filter 10. In this embodiment, a portion of the standard air filter 10 is cut away, such that only one frame member 16 is removed. For example, only the (top) end frame member 16*a* may be completely removed. In this example, (top) portions of the side frame members 16 (*b*) are also cut away to be shortened, and a (top) portion of the filter material 12 is cut away and removed. The support material 20 is cut from the supplied amount, folded to form the replacement (top) end frame member 46*a* and then secured to the nascent filter, as described above. Next, the support material 20' is cut and folded to form a (side) frame member 60 that is then secured to one of the shortened side frame members 16 (*b*), as described above. The custom air filter that is formed in the manner described above is shorter than the standard air filter 10, but is wider than the standard air filter.

It should be appreciated that the support material 20, 20' may be provided without the scores 34 and that it may be used for purposes other than forming channel-shaped frame members. For example, the support material 20, 20' may be used to connect together air filters and/or pieces thereof or attach air filters to other structures.

It is to be understood that the description of the foregoing exemplary embodiment(s) is (are) intended to be only illustrative, rather than exhaustive. Those of ordinary skill will be able to make certain additions, deletions, and/or modifications to the embodiment(s) of the disclosed subject matter without departing from the spirit of the disclosure or its scope.

What is claimed is:

1. A method of forming a custom air filter, comprising:
providing an air filter comprising an outer frame formed from a plurality of frame members and a filter media arranged within the outer frame;
cutting at least one frame member of the outer frame and the filter media to form a cut air filter having a cut surface comprising at least one cut frame member and cut filter media;
providing a length of frame material comprising a substrate covered with a pressure sensitive adhesive, over which a release layer is disposed, wherein the frame material comprises a base that extends between two flanges;
folding the flanges of the length of frame material toward each other to form a substitute frame member;
removing the release layer from the substitute frame member to expose the pressure sensitive adhesive, wherein the release layer is removed after the frame material is folded to form the substitute frame member; and
pressing the substitute frame member into engagement with the cut surface of the cut air filter such that the exposed pressure sensitive adhesive bonds to the cut surface, thereby forming the custom air filter.

2. The method of claim 1, wherein the step of providing a length of frame material comprises providing a supply of the frame material and cutting off the length of frame material from the supply.

3. The method of claim 2, wherein the substrate of the frame material comprises cardboard.

4. The method of claim 1, wherein the frame material comprises a pair of parallel, spaced-apart scores formed therein that extend in a longitudinal direction of the frame material, wherein the base extends between the pair of scores.

5. The method of claim 1, wherein the step of cutting comprises cutting the air filter with a band saw having a blade with teeth, each of which has a sloping edge joined to a horizontal edge at a point, and wherein the band saw is operated such that the first parts of the teeth to contact the first air filter during the cutting are the sloping edges.

6. The method of claim 1, wherein the step of pressing the substitute frame member into engagement with the cut surface of the cut air filter comprises:
pressing the base of the substitute frame member against the cut surface; and
pressing the flanges of the substitute frame member against a front and a back of the cut air filter.

7. The method of claim 1, wherein the step of pressing the substitute frame member into engagement with the cut surface of the cut air filter comprises pressing the flanges of the substitute frame member into engagement with the at least one cut frame member.

8. The method of claim 1, wherein the cut surface comprises cut filter media extending between two cut frame members.

9. The method of claim 8, wherein the step of pressing the substitute frame member into engagement with the cut surface of the cut air filter comprises pressing the flanges of the substitute frame member into engagement with two cut frame members.

10. The method of claim 1, wherein the step of cutting the air filter comprises:
making a first cut through the air filter to form a first cut surface, wherein the first cut extends through a first frame member, the filter media, and a second frame member that is parallel to the first frame member; and
making a second cut through the air filter to form a second cut surface, wherein the second cut extends through the filter media and a third frame member that is orthogonal to the first frame member and the second frame member.

11. The method of claim 10, wherein the step of pressing the substitute frame member into engagement with the cut surface comprises:
pressing a first substitute frame member into engagement with the first cut surface; and
pressing a second substitute frame member into engagement with the second cut surface and the first substitute frame member.

12. The method of claim 11, wherein the first substitute frame member and the second substitute frame member are formed from a single length of the frame material.

13. The method of claim 11, further comprising:
folding the length of frame material along a fold that is oriented in a transverse direction of the length of frame material to form the first substitute frame member and the second substitute frame member;
wherein the first substitute frame member extends from a first end of the length of frame material to the fold; and
wherein the second substitute frame member extends from the fold to a second end of the length of frame material.

14. The method of claim 13, further comprising cutting the flanges of the length of frame material along the fold in the length of frame material.

15. The method of claim 14, wherein the step of pressing the substitute frame member into engagement with the cut surface comprises pressing the flanges of the second substitute frame member into engagement with the flanges of the first substitute frame member.

16. The method of claim 1, wherein the step of cutting the air filter forms a first cut air filter having a first cut surface and a second cut air filter having a second cut surface, and the method further comprises:

pressing a first substitute frame member into engagement with the first cut surface to form a first custom air filter; and pressing a second substitute frame member into engagement with the second cut surface and the first substitute frame member to form a second custom air filter.

17. The method of claim 14, further comprising:

providing an additional length of frame material and folding the flanges of the additional length of material towards each other to form an additional frame member;

arranging the first custom air filter adjacent to the second custom air filter; and pressing the additional frame member into engagement with the first custom air filter and the second custom air filter.

18. The method of claim 15, wherein:

the first custom air filter has a first width and a first length;

the second customer air filter has a second width and a second length; and the first width of the first custom air filter is equal to the second width of the second custom air filter.

19. The method of claim 16, wherein the first custom air filter is arranged adjacent to the second custom air filter so that the equal width of the first custom air filter corresponds to the equal width of the second custom air filter.

20. The method of claim 16, wherein:

the first width and the second width are less than an original width of the air filter; and the first length plus the second length is greater than an original length of the air.

* * * * *